INVENTOR
TOM HUTSON, JR.
C. O. CARTER
BY Young & Quigg
ATTORNEYS

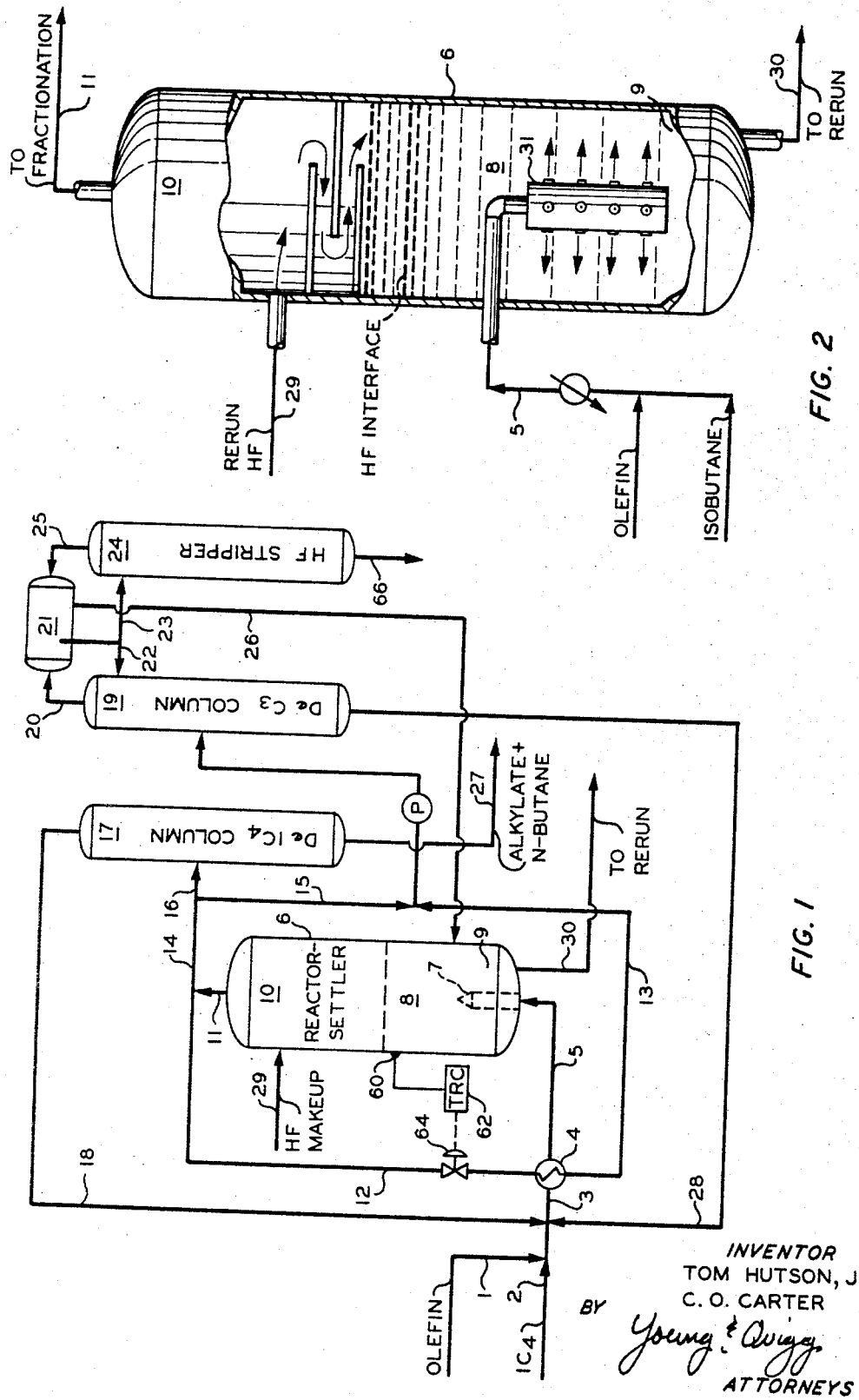

United States Patent Office 3,435,092
Patented Mar. 25, 1969

3,435,092
ALKYLATION UTILIZING FINE DISPERSION OF REACTANTS IN A CONSTANT CATALYST MASS
Tom Hutson, Jr., and Cecil O. Carter, Bartlesville, Okla., assignors to Phillips Petroleum Company, a corporation of Delaware
Filed Aug. 24, 1966, Ser. No. 574,611
Int. Cl. C07c 5/54, 3/56, 9/14
U.S. Cl. 260—683.43                    15 Claims

ABSTRACT OF THE DISCLOSURE

Alkylation reactants are introduced into a relatively static catalyst phase in the form of a fine dispersion of small droplets so as to form an emulsion in which the small droplets have an appreciable residence time in the relatively static catalyst phase.

This invention relates to alkylation. In one of its aspects it relates to the alkylation of an olefin with isopraffin in which the reactants are sprayed into a relatively static liquid catalyst zone under sufficient pressure to maintain the reactants in liquid phase, wherein separation of hydrocarbon and catalyst occurs in the reaction vessel.

In another of its aspects the invention relates to an apparatus for alkylation comprising a reaction chamber, a means for injecting olefin and isoparaffin in the lower portion of the chamber in a liquid phase as a very fine dispersion, means for introducing catalyst into the chamber above the bottom portion thereof, means for removing catalyst from the bottom of the reaction chamber and means for removing hydrocarbon substantially free of catalyst from the top portion of the chamber.

Many methods have been devised for the alkylation of an olefin with an isoparaffin. One such commercially feasible method as described and claimed in U.S. 3,190,935, T. Hutson, Jr., in which patent is disclosed a vertical reaction chamber in which catalyst, isoparaffin, and olefin pass vertically up a long reaction chamber and into a top setting zone. The catalyst is separated from the hydrocarbon phase and recycled to the operation. The hydrocarbon phase is removed, separated, and the unreacted materials are returned to the reaction. In this process and apparatus considerable amount of equipment is required. Although the process operates favorably, the exposure of large amounts of metal surfaces to the corrosive reactants causes severe corrosion problems.

In the alkylation of an isoparaffin with an olefin in the presence of a hydrogen halide catalyst, it is necessary that the olefin and isoparaffin contact the acid catalyst. Since the hydrocarbons and catalysts are mutually immiscible, and since the hydrocarbon phase is lighter than the catalyst phase, problems arise in maintaining the hydrocarbons in contact with the catalysts. The product formed depends on the contact time. Too short a contact time will result in a small conversion of reactants, requiring large recycle. Too lengthy contact time results in the formation of undesirable secondary products, such as low octane number isoparaffin, and polymers of the olefin. One method of maintaining the desired contact between the two phases is to continuously introduce the hydrocarbons into a flowing catalyst stream and settling the phases at the end of the flowing stream as is carried out in U.S. 3,190,935. However, in this system, extensive piping is required, which piping causes corrosion problems. Further, the contact time between catalyst and reactants is difficult to regulate. Thus, it is desirable to carry out the reaction and separation processes with the least amount of piping possible and in such a way that the contact time can be closely controlled.

One method of avoiding the problems of corrosion in piping is to carry out the reaction and separation in a single reaction chamber. The problem in a single reaction chamber is maintaining the hydrocarbon dispersed in the catalyst phase for a sufficient period of time to allow a substantial conversion to take place. Many methods have been devised to maintain dispersion of hydrocarbon in the reaction zone. One such method is described and claimed in U.S. Patent 3,249,649, in which a plurality of reaction trays in a vertical tower separate hydrocarbon from catalyst and continuously introduce olefin in an area within the column at which the hydrocarbon is concentrated.

We have now devised a simple method and apparatus for carrying out the alkylation of an olefin with an isoparaffin whereby separation and the reaction take place in the same chamber. A fine dispersion of olefin and isoparaffin is sprayed into a relatively static catalyst containing zone in such a manner that a fine dispersion of hydrocarbon and the acid occurs. Preferably, the olefin and isoparaffin are sprayed into the chamber near the bottom thereof and the separation takes place near the top of the chamber whereby hydrocarbon can be removed from the top of the chamber. The size of the reactant droplets in the catalyst, the relative densities of the hydrocarbon and catalyst phases and the height of the catalyst phase in the zone determine the desired contact time.

By various aspects of this invention, one or more of the following, or other, objects can be obtained.

It is an object of this invention to provide a process for alkylation of an alkylatable hydrocarbon with an alkylating agent in the presence of a catalyst whereby the alkylation and separation can be carried out in a single vessel.

It is a further object of this invention to provide an alkylation process and apparatus whereby corrosion in the alkylation equipment is minimized.

It is a still further object of this invention to provide a process and apparatus for alkylation of an olefin with an isoparaffin in the presence of a hydrogen halide catalyst in which a fine dispersion of the isoparaffin and the olefin in the acid phase is maintained to provide a sufficient residence time of the isoparaffin olefin mixture in the catalyst to produce a higher octane member alkylate.

It is a further object of this invention to provide a process and apparatus for the alkalation of an olefin with an isoparaffin in the presence of a hydrogen halide catalyst in which the residence time or contact time of the reactants in the catalyst can be closely controlled to produce a high octane alkylate in good yield.

It is yet another object of this invention to provide a process and apparatus for producing a higher octane alkylate.

Other aspects, objects, and several advantages of this invention are apparent to one skilled in the art from a study of this disclosure, the drawings, and the appended claims.

According to the invention, an alkylation process and apparatus are provided in which the alkylation reaction and the separation of hydrocarbon phase from catalyst phase occurs in a single vessel. Preferably, a vertical reaction vessel is used in which olefin and isoparaffin are sprayed into the bottom portion thereof in a fine dispersion, and a catalyst, preferably liquid $AlCl_3$ complex or liquid hydrogen halide, is introduced into the reaction zone above the point at which olefin and isoparaffin are introduced to maintain a liquid catalyst phase in the area in which the isoparaffin and olefin are sprayed. The separation of the hydrocarbon from the acid takes place in the top portion of the reaction chamber, and hydrocarbon is removed from the top portion of the chamber for further processing. A small amount of liquid hydrogen halide is removed from the bottom portion of the chamber, below the area into which the hydrocarbon is sprayed, for regeneration. The size of the droplets of the reactants in catalyst and the amount of catalyst through which the reactants pass determine the contact time or residence time of the reactants in the catalyst.

In one embodiment of the invention, a non-metallic sintered tube is used to produce a fine dispersion of the olefin and isoparaffin in the catalyst. In another embodiment, a circular baffle is used to promote circulation of the reactants and catalysts within the reaction zone.

In carrying out the invention, it is necessary to introduce the olefin and isoparaffin in the catalyst phase in a fine dispersion. Generally, the size of the droplets will be in the range of 10 microns to 1000 microns, preferably 10 microns to 100 microns. The dispersion can be produced in a number of ways. Preferably, the dispersion is produced by introducing the isoparaffin and olefin into the catalyst phase with the use of a high pressure jet nozzle in which the two components are sprayed into the catalyst phase at a high pressure and at a high speed. The nozzle velocity and the pressure drop across the nozzle will determine the droplet size and degree of dispersion. Generally, for a height of catalyst above the nozzle of 5 inches to 30 inches, the nozzle velocity will be 50 feet per second to 100 feet per second with the pressure drop across the nozzle in the range of 15 to 150 p.s.i.g., preferably 24–45 p.s.i.g. It is obvious that other conditions could be employed to produce the desired contact or residence time of the reactants in the catalyst. It is to be understood that the above conditions are given by way of example rather than as a limitation on the reaction.

A desirable contact time or residence time of reactant in catalyst will be in the range of 15 seconds to 25 seconds.

The invention will now be described with reference to the accompanying drawings in which:

FIGURE 1 is a schematic of an embodiment according to the invention.

FIGURE 2 is a detail of the reaction zone shown in FIGURE 1.

Figure 4:
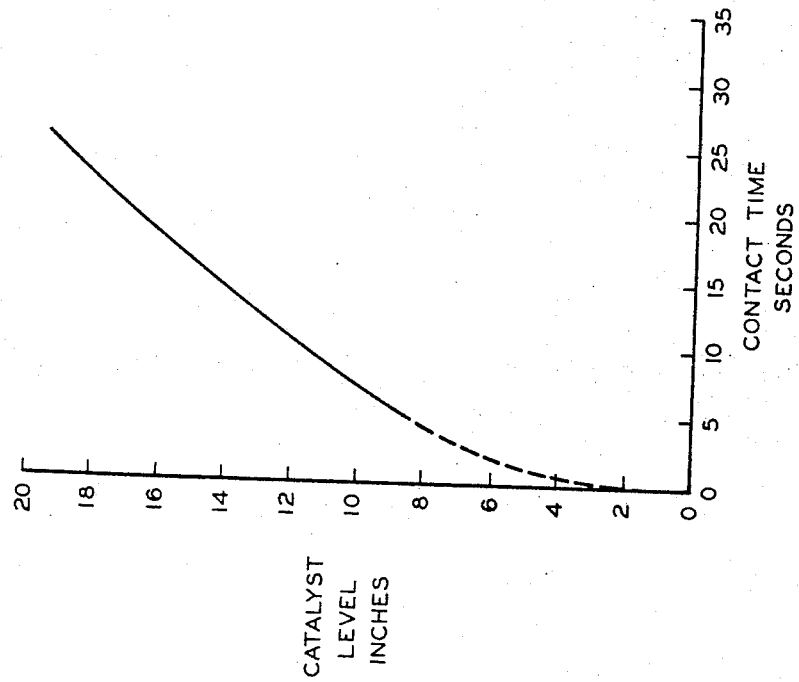
FIGURE 4 is a graph showing a correlation between catalyst height and contact time of reactants in catalyst.

Referring now to the drawings, which will be described with reference to the alkyltaion of an isoparaffin with an olefin in the presence of a hydrogen halide catalyst, an olefin and isoparaffin are introduced through lines 1 and 2, respectively, combined in line 3, passed through heat exchanger 4, passed through line 5 into reactor-settler 6. The reactants are sprayed into a bottom section 8 of reactor-settler 6 through a spray nozzle 7 which produces a fine dispersion of the reactants in the catalyst phase. According to the invention, the level of catalyst phase above nozzle 7 and the fineness of the spray are adjusted so that there results an optimum residence time of reactants in catalyst to produce the maximum octane possible. Hydrogen halide catalyst is introduced into reactor 6 through line 29 and gravitates to the bottom portion of the reactor-settler 6. The section 8 contains a substantially catalyst phase having dispersed therein fine liquid droplets of isoparaffin and olefin. Section 8 of reactor-settler 6 is a relatively static zone except for the spraying of the fine dispersion of reactants therein. Catalyst phase settles into section 9 and is removed through line 30 for regeneration and recycle. Hydrocarbon phase containing alkylate, isoparaffin, and olefin gradually rises to section 10 in reactor-settler 6 and is removed through line 11. A portion of the hydrocarbon phase can be passed through line 12, through a pressure reduction valve (not shown) and heat exchanged in heat exchanger 4 with the incoming feed. This pressure reduction in the heat exchanger serves to vaporize the hydrocarbon phase from the reactor and thereby cool the incoming feed. The reaction temperature at least in part is controlled by this heat exchange operation. Temperature sensor 60 senses the temperature of the reaction in section 8 of reactor-settler 6. A signal representative of the temperature in section 8 is sent to temperature recorder-controller 62 which accordingly adjusts valve 64 to provide more or less cooling for the reaction zone. It is within the scope of the invention to provide other temperature control means, such as external cooling coils on the reactor and the like. Alternatively, the pressure in the top of the reactor can be controlled to regulate the amount of evaporation of the liquid hydrocarbon phase to cool the reactor. Hydrocarbon line 13 can be heated or cooled further, if desired, and then combined with the remainder of the hydrocarbon phase which is passed through line 14 and line 15 into a separation zone in which, for example, could separate propane from isobutane. A portion of the hydrocarbon in line 14 is passed through line 16 to separator 17 in which, for example, isoparaffin is removed as an overhead product through line 18 and recycled to the reactor. Heavier products containing alkylate and normal butane, for example, are removed from separator 17 through line 27. Isoparaffin is also removed from separator 19 through line 28 and recycled to the operation. Overhead from separator 19 containing a hydrocarbon-HF azeotrope is removed through line 20 and passed to a condenser (not shown) and to accumulator-separator 21. A liquid stream of hydrocarbons from accumulator 21 is recycled through line 22 to separator 19 as reflux and a second portion of the liquid hydrocarbon is passed to acid stripper 24 in which any hydrogen halide catalyst entrained in the hydrocarbon phase is removed as an overhead stream through line 25 and passed through a condenser (not shown) to accumulator-separator 21 from which it is removed through line 26 and recycled to reactor-settler 6. Bottoms containing propane from stripper 24 are removed through line 66.

Spray nozzle 7 can be any suitable nozzle which will introduce olefin and hydrocarbon into the catalyst phase in a fine dispersion. A higher velocity nozzle is preferred. Examples of suitable nozzles include Monarch Type F–80, No. 50 and Whirljet nozzles. The preferred nozzles are those which give a rotating or whirling conical spray.

The alkylatable material useful in this invention can be a paraffinic material, such as an isoparaffin, having a tertiary carbon atom; typical paraffinic materials include isobutane or higher homologs of isobutane which contain tertiary carbon atoms, for example, 2-methylbutane, 2-methylpentane, 2,4-dimethylpentane, etc. Other alkylatable materials include benzene, toluene, xylene, naphthenes, phenols, cresols, amines, thiophenes, isoparaffinic mercaptans, and the like.

The olefin useful in this invention can consist of an olefins or a substituted alkyl compound. Typical olefins which can be used include ethylene, propylene, butene-1, butene-2, isobutylene, pentenes, hexenes, etc.

The alkylation reaction is effected in the presence of an acid catalyst, usually a mineral acid catalyst such as hydrogen fluoride or sulfuric acid. Other suitable acid catalysts include phosphoric acid, hydrochloric acid, mixtures of mineral acids with Friedel-Crafts metal halides such as aluminum chloride, aluminum bromide and zinc chloride, mixtures of boron trifluoride and hydrogen halide, and other liquid proton doners. Alkylation conditions include a temperature of from about 40° F. to about 150° F., a pressure sufficient to maintain the reactants in the liquid phase, that is, from about 50 to about 250 p.s.i., an alkylatable material, olefin mol ratio of from about 2 to about 12 or higher, and an acid:reactant liquid volume ratio within the range of from about 1.5 to about 5. Ideally, the reactants combine to yield, as a primary product, a paraffin species of carbon content equal to the sum of the carbon atoms of the olefin and alkylatable material, and through careful control of operating conditions, a primary product yield in excess of 90% is easily obtained.

Referring now to FIGURE 2 in which an embodiment of the invention is shown in which a dispersion means 31 which injects the reactants laterally into section 8. The olefin and isobutane is introduced through line 5 and through dispersion means 31. The dispersion means 31 can be a sintered tube or a group of horizontally directed nozzles through which the liquid reactants are directed toward the outer portions of section 8 into the catalyst phase in a fine dispersion. The sintered tube can be made of any suitable metallic or non-metallic materials such as stainless steel, carbon, and in some instances thermoplastic or thermosetting resins.

Figure 3:
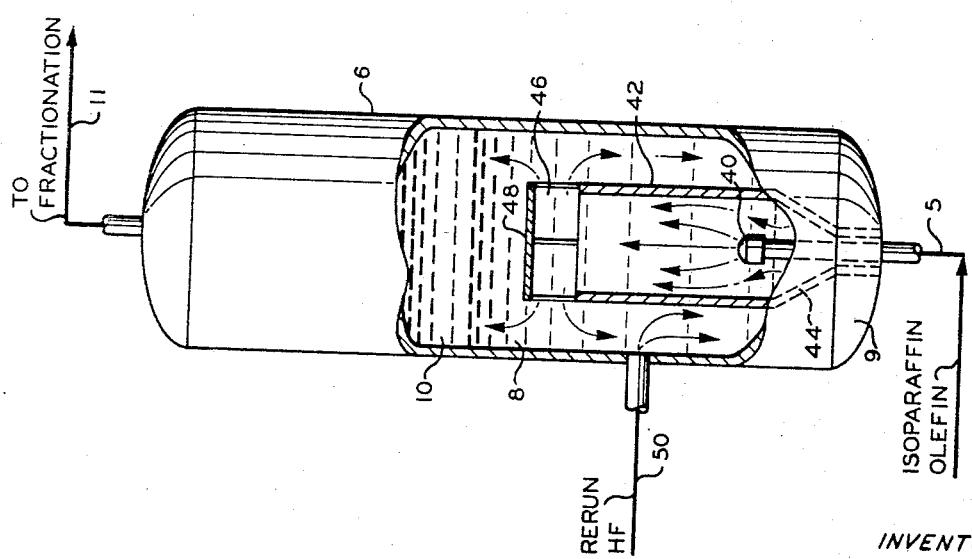
FIGURE 3 is a view of the reactor shown in FIGURE 1 in which a second embodiment of the invention is shown.

Referring now to FIGURE 3, where like numerals have been used to refer to like parts, a high velocity nozzle 40 introduces isoparaffin and olefin in line 5 into section 8 of reactor-settler 6. The nozzle is surrounded by a cylindrical baffle 42 which has apertures 44 at the bottom portion thereof below the point of introduction of the isoparaffin and olefin. At the top portion of baffle 42 there is provided a cylindrical plate 48 and a plurality of apertures 46. The acid catalyst is drawn in through apertures 44 and passes up through baffle 42 in intimate contact with the fine dispersion of olefin and isoparaffin introduced through high velocity nozzle 40. The mixture passes through apertures 46 and a portion of the reacted and unreacted products as well as the catalyst are drawn down around the sides of baffle 42 and back in through apertures 44. This type of baffle arrangement provides for very effective circulation and agitation within the reaction zone as well as a prolongation of the time of contact. Fresh catalyst and rerun catalyst can be introduced through line 50. The top plate 48 directs the stream of catalyst and reactants outwardly instead of upwardly. This allows disengaging of the hydrocarbon phase from the acid phase in section 10. Without plate 48, the cylindrical baffle 42 would cause disturbance of the interface between the hydrocarbon and the catalyst, making settling more difficult.

FIGURE 4 shows a graph of catalyst level vs. contact time. The graph indicates that as the catalyst level increases, the contact time increases almost linearly. The test data was procured using a simulated reaction condition, a 4-inch Pyrex pipe, hexane and water.

As a specific example of how the invention works, a run was made for the alkylation of isobutane with olefin in an apparatus according to the invention (run 2) and in an apparatus of the open tube reactor type such as that described and claimed in U.S. 3,190,935 (run 1). The tests were carried out using a HF catalyst, reacting isobutane with propylene-butylene mixture. The following process conditions, yields, and properties were obtained.

| Description | Run 1 | Run 2 |
|---|---|---|
| | "Base" test open tube reactor | Test with new reactor-settler using Monarch No. 5 nozzle |
| Process conditions: | | |
| Reactor temp., °F | 80 | 85 |
| Residence time, sec | 34 | 16 |
| Isobutane/olefin, vol. ratio | 12.5 | 13.0 |
| Pressure drop across nozzle, p.s.i | | 31 |
| Nozzle velocity, f.p.s | | 81 |
| HF analysis, wt. percent: | | |
| Total acidity | 90.3 | 90.5 |
| Acid soluble oil | 0.30 | 0.49 |
| Water | 3.68 | 1.93 |
| Olefin conversion, percent | 100.0 | 100.0 |
| Yields: | | |
| Alkylate/olefin (vol.) | 1.66 | 1.71 |
| Isobutane consumed/olefin | 1.16 | 1.12 |
| Alkylate properties: | | |
| API gravity | 70.6 | 70.2 |
| ASTM dist., °F.: | | |
| IBP | 120 | 141 |
| 5% | 161 | 181 |
| 10% | 172 | 191 |
| 50% | 214 | 212 |
| 90% | 283 | 240 |
| 95% | 334 | 271 |
| EP | 397 | 355 |
| Research, octane number (+3 ml. TEL) | 103.8 | 106.3 |
| Motor, octane number (+3 ml. TEL) | 105.2 | 107.3 |

In run number 2 the nozzle throughput was 5.79 gallons/hour, the nozzle velocity was 81 feet/second and the nozzle pressure drop was 31 p.s.i. In run number 2, the height of the catalyst above the nozzle was 10 inches.

The above data show that by the invention a higher octane alkylate having a narrower boiling point range was obtained than in the conventional vertical tube reactor.

Whereas the invention has been described with reference to a generally vertical reaction zone, it is obvious that the invention could be carried out in a horizontal reaction zone having a plurality of nozzles spaced apart at the bottom portion thereof to inject a fine dispersion of reactants into catalyst phase so long as the nozzle velocity, pressured drop across the nozzle, and catalyst height is adjusted to give a proper residence time of reactants in catalyst.

In the alkylation of an olefin with an isoparaffin using the method described and claimed in U.S. 3,190,935 in which a long vertical reaction tube is desired, spray nozzles can also be used. The spray nozzles would inject a mixture of isoparaffin and olefin in the base of the vertical tube into the flowing stream of acid catalyst. The nozzles could be the same kind of nozzles as have been set forth herein and the velocity of introduction of the mixture into the acid as well as the droplet size would be the same as have been set forth herein. The use of the fine dispersion of reactants in the catalyst in this type of reactor has been found to increase the octane number of the alkylate by about 2.

It is also within the scope of this invention to employ a plurality of reactors or reaction zones as have been heretofore described. For example, in the production of diisopropyl by the alkylation of ethylene with butane using an aluminum chloride catalyst where lower conversion is experienced, the hydrocarbon phase, after being separated from the catalyst phase in a first reactor, can be passed to a second reactor and therein contacted by spraying, as hereinbefore described, to realize a higher conversion.

The invention can also be carried out by spraying the reactants into the bottom portion of a reactor containing internal heat exchange tubes which extend vertically in the reactor. Cooling fluid can be introduced into the tubes to control the temperature of the reactor.

Reasonable variation and modification are possible within the scope of the foregoing disclosure, the drawings, and the claims to the invention without departing from the spirit thereof.

We claim:

1. A process for alkylating an olefin with an alkylatable material in the presence of an alkylation catalyst which process comprises maintaining a constant mass of said catalyst in the liquid state in a reaction zone; passing a liquid mixture of said alkylatable hydrocarbon and said olefin into said mass of catalyst from a nozzle, the pressure drop across said nozzle being within the range of 15 to 150 p.s.i.g. so as to give a fine dispersion of droplets of said mixture in said catalyst, said droplets having a diameter within the range of 10 to 100 microns; maintaining sufficient pressure to keep said mixture in the liquid state; maintaining a temperature within the range of 40° to 150° F. such that said alkylation reaction takes place; and recovering alkylate product by phase separation.

2. A process according to claim 1 wherein said phase separation takes place in a top portion of said reaction zone.

3. A process according to claim 1 wherein the height of catalyst in said reaction zone is within the range of 5 to 30 inches.

4. A process according to claim 1 wherein makeup catalyst is added at a point above the point of introduction of said hydrocarbon materials and wherein a portion of said catalyst is withdrawn from the bottom portion of the reaction zone for regeneration and recycle.

5. A process according to claim 1 wherein said alkylatable material is isobutane, said olefin is at least one olefin selected from a group consisting of ethylene, propylene, and isobutene, and said alkylation catalyst is HF.

6. A process according to claim 1 wherein said droplets are introduced in the form of a whirling conical spray.

7. A process according to claim 1 wherein said droplets are introduced near the bottom of said reaction zone at a nozzle velocity of between 50 and 100 feet per second.

8. A process for alkylating an olefin with an alkylatable material in the presence of an alkylation catalyst which process comprises: maintaining a constant mass of said catalyst in the liquid state in a reaction zone; passing a liquid mixture of said alkylatable hydrocarbon and said olefin into said mass of catalyst from a nozzle, the pressure drop across said nozzle being within the range of 15 to 150 p.s.i. so as to give a fine dispersion of droplets of said mixture in said catalyst, said droplets being sufficiently fine so as to have an average contact time within said mass of 15 to 25 seconds; maintaining sufficient pressure to keep said mixture in the liquid state; maintaining a temperature such that said alkylation reaction takes place; and recovering alkylate product by phase separation.

9. A process according to claim 8 wherein said phase separation occurs in a top portion of said reaction zone.

10. A process according to claim 8 wherein the height of catalyst in said reaction zone is within a range of 5 to 30 inches.

11. A process according to claim 8 wherein makeup catalyst is added at a point above the point of introduction of said hydrocarbon and olefin, and wherein a portion of said catalyst is withdrawn from the bottom portion of the reaction zone for regeneration and recycle.

12. A process according to claim 8 wherein said alkylatable material is isobutane, said olefin is at least one olefin selected from the group consisting of ethylene, propylene, isobutene, and said alkylation catalyst is HF.

13. A process according to claim 8 wherein said droplets are introduced in the form of a whirling conical spray.

14. A process according to claim 8 wherein said droplets are introduced near a bottom portion of said reaction zone at a nozzle velocity of between 50 and 100 feet per second.

15. A process according to claim 8 wherein said droplets have a diameter within the range of 10 to 100 microns.

References Cited

UNITED STATES PATENTS

| | | |
|---|---|---|
| 2,386,681 | 10/1945 | Hadden. |
| 2,454,869 | 11/1948 | Goldsby et al. _____ 260—683.48 |
| 2,720,447 | 10/1955 | Jones et al. _____ 260—683.48 |
| 2,747,003 | 5/1956 | Kilpatrick _____ 260—683.48 |
| 3,212,860 | 10/1965 | Vernon _____ 260—683.48 |
| 3,254,137 | 5/1966 | Hutto et al. _____ 260—683.48 |
| 3,275,565 | 9/1966 | Sailors _____ 260—683.48 |

DELBERT E. GANTZ, *Primary Examiner.*

G. J. CRASANAKIS, *Assistant Examiner.*

U.S. Cl. X.R.

260—683.48